United States Patent
Kupcsik et al.

(10) Patent No.: US 11,498,212 B2
(45) Date of Patent: Nov. 15, 2022

(54) METHOD AND SYSTEM FOR ROBOT MANIPULATION PLANNING

(71) Applicant: Robert Bosch GmbH, Stuttgart (DE)

(72) Inventors: Andras Gabor Kupcsik, Boeblingen (DE); Leonel Rozo, Boeblingen (DE); Marco Todescato, Stuttgart (DE); Markus Spies, Karlsruhe (DE); Markus Giftthaler, Freising (DE); Mathias Buerger, Stuttgart (DE); Meng Guo, Renningen (DE); Nicolai Waniek, Dornstadt (DE); Patrick Kesper, Korntal-Muenchingen (DE); Philipp Christian Schillinger, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 16/892,811

(22) Filed: Jun. 4, 2020

(65) Prior Publication Data
US 2020/0398427 A1 Dec. 24, 2020

(30) Foreign Application Priority Data

Jun. 21, 2019 (EP) .................................. 19181874

(51) Int. Cl.
*B25J 9/16* (2006.01)
*G06N 20/00* (2019.01)
*G06N 7/00* (2006.01)

(52) U.S. Cl.
CPC .......... *B25J 9/1664* (2013.01); *B25J 9/1661* (2013.01); *G05B 2219/39205* (2013.01);
(Continued)

(58) Field of Classification Search
CPC ........ B25J 9/1664; B25J 9/163; B25J 9/1661; B25J 9/1679; G05B 2219/39205;
(Continued)

(56) References Cited

U.S. PATENT DOCUMENTS

2004/0186717 A1 9/2004 Savic et al.
2007/0250461 A1* 10/2007 Sabe ...................... G06N 20/00
706/12

(Continued)

FOREIGN PATENT DOCUMENTS

KR 20160080349 A 7/2016

OTHER PUBLICATIONS

Moon T., "The Expectation-Maximization Algorithm," Nov. 1996, IEEE, pp. 47-60 (Year: 1996).*

(Continued)

*Primary Examiner* — Abby Y Lin
*Assistant Examiner* — Karston G. Evans
(74) *Attorney, Agent, or Firm* — Norton Rose Fulbright US LLP; Gerard Messina

(57) ABSTRACT

A method for planning a manipulation task of an agent, particularly a robot. The method includes: learning a number of manipulation skills wherein a symbolic abstraction of the respective manipulation skill is generated; determining a concatenated sequence of manipulation skills selected from the number of learned manipulation skills based on their symbolic abstraction so that a given goal specification indicating a given complex manipulation task is satisfied; and executing the sequence of manipulation skills.

13 Claims, 2 Drawing Sheets

(52) U.S. Cl.
CPC .............. *G05B 2219/40113* (2013.01); *G05B 2219/40391* (2013.01); *G06N 7/005* (2013.01); *G06N 20/00* (2019.01)

(58) Field of Classification Search
CPC ........... G05B 2219/40113; G05B 2219/40391; G05B 2219/40429; G05B 2219/40465; G05B 2219/40629; G06N 5/003; G06N 20/00; G06N 7/005
See application file for complete search history.

(56) References Cited

U.S. PATENT DOCUMENTS

| | | | | |
|---|---|---|---|---|
| 2010/0318479 | A1* | 12/2010 | Noda | ............... G06V 20/10 706/12 |
| 2013/0218340 | A1 | 8/2013 | Hager et al. | |
| 2021/0205988 | A1* | 7/2021 | James | ............... B25J 9/163 |
| 2022/0143831 | A1* | 5/2022 | Kupcsik | ............... B25J 9/1664 |

OTHER PUBLICATIONS

Hundtofte C., Hager G., Okamura A., "Building a Task Language for Segmentation and Recognition of User Input to Cooperative Manipulation Systems," 2002, IEEE (Year: 2002).*

Squire K., Levinson S., "HMM-Based Concept Learning for a Mobile Robot," Apr. 2007, IEEE, pp. 199-212 (Year: 2007).*

Martinez D., et al., "Active Learning of Manipulation Sequences," 2014, IEEE, pp. 5671-5678 (Year: 2014).*

Paxton C., Kobilarov M., Hager G., "Towards Robot Task Planning From Probabilistic Models of Human Skills," Feb. 15, 2016, arXiv (Year: 2016).*

Zeestraten M., Calinon S., Caldwell D., "Variable Duration Movement Encoding with Minimal Intervention Control," May 2016 (Year: 2016).*

Hayes B., Scassellati B., "Autonomously Constructing Hierarchical Task Networks for Planning and Human-Robot Collaboration," May 2016, IEEE, pp. 5469-5476 (Year: 2016).*

Havoutis I., Calinon S., "Supervisory teleoperation with online learning and optimal control," 2017, IEEE, pp. 1534-1540 (Year: 2017).*

Savarimuthu T., et al., "Teaching a Robot the Semantics of Assembly Tasks," May 2018, IEEE, pp. 670-692 (Year: 2018).*

Liang Y., Pellier D., Fiorino H., Pesty S., "A Framework for Robot Programming in Cobotic Environments: First user experiments," Oct. 19, 2018, arXiv (Year: 2018).*

Rozo L., et al., "Learning and Sequencing of Object-Centric Manipulation Skills for Industrial Tasks," Oct. 2020, IEEE, pp. 9072-9079 (Year: 2020).*

Ahmadzadeh, et al.: "Visuospatial Skill Learning for Robots", arxiv.org, Cornell University Library, 201 Olin Ibrary Cornell University Ithaca, NY, Jun. 3, 2017, XP080767339, pp. 1-24.

Paxton, et al.: "Do What I Want, Not What I Did: Imitation of Skills by Planning Sequences of Actions", arxiv.org, Ornell Niversity Library, 201 Olin Library Cornell University Ithaca, NY, Dec. 5, 2016, XP080736730, pp. 1-8.

Pigant, eyt al.:: "Learning adaptive dressing assistance from human demonstration", J Robotics and Autonomous Systems vol. 93:61-75, (2017), XP055674005.

S. Niekum et al., "Learning Grounded Finite-State Representations From Unstructured Demonstrations", The International Journal of Robotics Research, 34(2), 2015, pp. 1-45.

Kullback, S., et al., "On Information and Sufficiency," Ann. Math. Statist. 22 (1951), No. 1, 79-86. https://projecteuclid.org/euclid.aoms/1177729694.

* cited by examiner

METHOD AND SYSTEM FOR ROBOT MANIPULATION PLANNING

CROSS REFERENCE

The present application claims the benefit under 35 U.S.C. § 119 of European Patent Application No. EP 19181874.9 filed on Jun. 21, 2019, which is expressly incorporated herein by reference in its entirety.

FIELD

The present invention relates to automatic processes for planning tasks by determining a sequence of manipulation skills. Particularly, the present invention relates to a motion planning framework for robot manipulation.

BACKGROUND INFORMATION

General use of robots for performing various tasks is challenging, as it is almost impossible to preprogram all robot capabilities that may potentially be required in the latter application. Training the skill whenever it is needed renders the use of robots inconvenient and will not be accepted by a user. Further, simply recording and replaying a demonstrated manipulation is often insufficient, because changes in the environment, such as varying robot and/or object poses, would render any attempt unsuccessful.

Therefore, the robot needs to recognize and encode the intentions behind these demonstrations and should be capable to generalize the trained manipulation to unforeseen situations. Furthermore, several skills need to be performed in a sequence to accomplish complex tasks. The task planning problem aims to define the right sequence of actions and needs a prespecified definition of the planning model and of the preconditions and effects of all available skills. Due to the large variation of skills, the definition of such a planning model quickly becomes impractical.

SUMMARY

According to the present invention, a method for planning an object manipulation, and a system for planning object manipulation are provided.

Further embodiments are described herein.

According to a first aspect of the present invention, an example method for planning a manipulation task of an agent, particularly a robot, is provided, comprising the steps of:
  Learning (Training) a number of manipulation skills ($a_{f_n}$) wherein a symbolic abstraction of the respective manipulation skill is generated;
  Determining a concatenated sequence of manipulation skills selected from the number of learned manipulation skills based on their symbolic abstraction so that a given goal specification indicating a given complex manipulation task is satisfied;
  Executing the sequence of manipulation skills.

Further, the learning of the number of manipulation skills may be performed in that a plurality of manipulation trajectories for each respective manipulation skill is recorded, particularly by demonstration, a task parametrized Hidden Semi-Markov model (TP-HSMM) is determined depending on the plurality of manipulation trajectories for each respective manipulation skill and the symbolic abstraction of the respective manipulation skill is generated.

The above task planning framework allows a high-level planning of a task by sequencing general manipulation skills. Manipulation skills are action skills in general which may also include translations or movements. The general manipulation skills are object-oriented and respectively relate to a single action performed on the object, such as a grasping skill, a dropping skill, a moving skill or the like. These manipulations skills may have different instances, which means that the skills can be carried out in different ways (instances) according to what is needed to be done next. Furthermore, the general skills are provided with object centric symbolic action descriptions for the logic-based planning.

The above method is based on learning from demonstration by means of fitting a prescribed skilled model, such as a Gaussian mixture model to a handful of demonstrations. Generally, a TP-GMM task parameterized Gaussian mixture model may be described which can then be used to an execution to reproduce a trajectory for the learned manipulation skill. The TP-GMM is defined by one or more specific frames (coordinate systems) which indicates the translation and rotation with respect to a word frame. After observation of the actual frame, the learned TP-GMM can be converted into a single GMM. One advantage of the TP-GMM is that the resulting GMM can be updated in real time according to the observed task parameters. Hence, the TP-HSMM allows to adapt to changes in the objects during the execution of the manipulation task.

Furthermore, the generating of the symbolic abstraction of the manipulations skills may comprise constructing a PDDL model, wherein objects, initial state and goal specification define a problem instance, while predicates and actions define a domain of a given manipulation, wherein particularly the symbolic abstraction of the manipulations skills uses a classical PDDL planning language.

It may be provided that the concatenated sequence of manipulation skills is determined, such that the probability of achieving the given goal specification is maximized, wherein particularly a PDDL planning step is used to find a sequence of actions to fulfill the given goal specification, starting from a given initial state.

According to an example embodiment of the present invention, the transition probability between states of the TP-HSMM may be determined using Expectation-Maximization.

Moreover, a task parametrized Hidden Semi-Markov model (TP-HSMM) may be determined by cascading manipulations skills, wherein a Viterbi algorithm is used to retrieve the sequence of states from the single TP-HSMM based on the determined concatenated sequence of manipulation skills.

Parameters of the TP-HSMM may be learned through a classical Expectation-Maximization algorithm.

Furthermore, the symbolic abstractions of the demonstrated manipulation skills may be determined by mapping low-variance geometric relations of segments of manipulation trajectories into the set of predicates.

According to an example embodiment of the present invention, the step of determining the concatenated sequence of manipulation skills may comprise an optimization process, particularly with the goal of minimizing the total length of the trajectory.

Particularly, determining the concatenated sequence of manipulation skills may comprise selectively reproducing one or more of the manipulation skills of a given sequence of manipulation skills so as to maximize the probability of satisfying the given goal specification.

Furthermore, determining the concatenated sequence of manipulation skills may include the steps of:

Cascading the TP-HSMMs of consecutive manipulation skills into one complete model by computing transition probabilities according to a divergence of emission probabilities between end states and initial states of different manipulations skills;

Searching the most-likely complete state sequence between the initial and goal states of the manipulation task using a modified Viterbi algorithm.

Particularly, the modified Viterbi algorithm may include missing observations and duration probabilities.

According to a further embodiment of the present invention, a device for planning a manipulation task of an agent, particularly a robot, is provided, wherein the device is configured to:

learn a number of manipulation skills, wherein a symbolic abstraction of the respective manipulation skill is generated;

determine a concatenated sequence of manipulation skills selected from the number of learned manipulation skills based on their symbolic abstraction so that a given goal specification indicating a complex manipulation task is satisfied; and instruct execution of the sequence of manipulation skills.

BRIEF DESCRIPTION OF THE DRAWINGS

Example embodiments of the present invention are described in more detail in conjunction with the figures.

DETAILED DESCRIPTION OF EXAMPLE EMBODIMENTS

Figure 1:
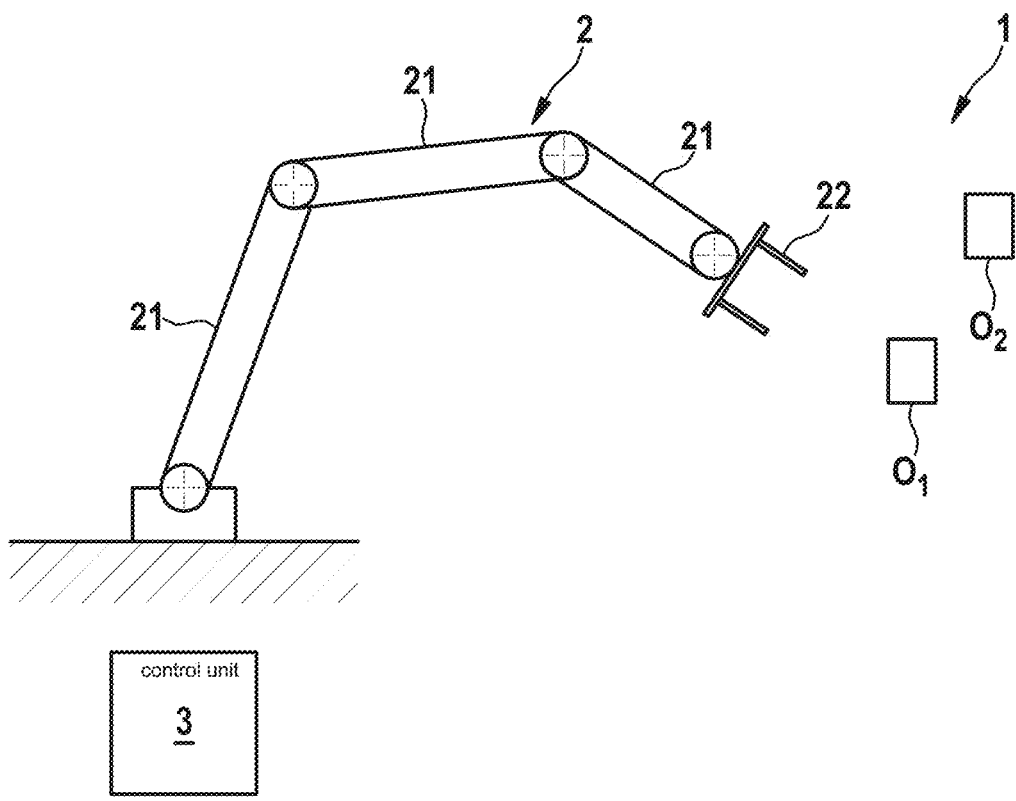
FIG. 1 schematically shows a robot arm.

FIG. 1 shows a system (agent) 1 including a controllable robot arm 2 as an example of an object manipulator. The robot arm 2 is a multi-DoF robotic arm with several links 21 and an end-effector 22 which allows a state $x \in \mathbb{R}^3 \times S^3 \times \mathbb{R}^1$ (describing the Cartesian position, orientation and gripper state in a global coordinate system (frame)), that operates within a static or dynamic and known workspace. Also, within the reach of the robot arm 2, there are objects of interest denoted by $O = \{o_1, o_1, \ldots, o_J\}$.

Within this setup, a human user can perform several kinesthetic demonstrations on the arm to manipulate one or several objects for certain manipulation skills. Denote by $A = \{a_1, a_1, \ldots, a_H\}$ the set of demonstrated skills. Moreover, for manipulation skill $a_h \in A$, the set of objects involved is given by $O_{a_h}$ and the set of available demonstrations is denoted by $D_{a_h}$.

The robot arm 2 is controlled by means of a control unit 3 which may actuate actuators to move the robot arm 2 and activate the end effector 22. Sensors may be provided at the robot arm 2 or at the robot workspace to record the state of objects in the robot workspace. Furthermore, the control unit 3 is configured to record movements made with the robot arm 2 and to obtain information about objects in the workspace from the sensors and further to perform a task planning process as described below. The control unit 3 has a processing unit where the algorithm as described below is implemented in hardware and/or software.

All demonstrations are described by the structure of TP-GMM (task-parametrized-Gaussian Mixture Models). The basic idea is to fit a prescribed skill model such as GMMs to multiple demonstrations. GMMs are described, e.g., in S. Niekum et al. "Learning grounded finite-state representations from unstructured demonstrations", The International Journal of Robotics Research, 34(2), pages 131-157, 2015. For a number M of given demonstrations (trajectory measurement results), each of which contains $T_m$ data points for a dataset, $N = M * T_m$ total observations $\xi = \{\xi_t\}_{t=1}^{N}$ exists, where $\xi_t \in \mathbb{R}^d$ for sake of clarity. Also, it is assumed the same demonstrations are recorded from the perspective of P different coordinate systems (given by the task parameters such as objects of interest). One common way to obtain such data is to transform the demonstrations from global frame (global coordinate system) to frame p by $\xi_t^{(p)} = A_t^{(p)^{-1}}(\xi_t - b_t^{(p)})$, where $\{(b_t^{(p)}, A_t^{(p)})\}_{p=1}^{P}$ is the translation and rotation of frame p with respect to the given global frame at time t. Then, a TP-GMM (task-parametrized-Gaussian Mixture Model) is described by the parameters $\{\pi_k, \{\mu_k^{(p)}, \Sigma_k^{(p)}\}_{p=1}^{P}\}_{k=1}^{K}$ where K represents the number of Gaussian components in the mixture model, $\pi_k$ is the prior probability of each component, and $\{\mu_k^{(p)}, \Sigma_k^{(p)}\}_{p=1}^{P}$ are the parameters of the k-th component within frame p. K may be manually assigned. However, there are approaches to automatically set K.

Differently from standard GMM learning, the mixture model above cannot be learned independently for each frame p. Indeed, the mixing coefficients $\pi_k$ are shared by all frames p and the k-th component in frame p must map to the corresponding k-th component in the global frame. For example, Expectation-Maximization (EM) is a well-established method to learn such models. In general, an expectation-maximization (EM) algorithm is an iterative method to find maximum likelihood or maximum a posteriori (MAP) estimates of parameters in a statistical model, which depends on unobserved latent variables.

Once learned, the TP-GMM can be used during execution to reproduce a trajectory for the learned skill. Namely, given the observed frames $\{b_t^{(p)}, A_t^{(p)}\}_{p=1}^{P}$, the learned TP-GMM is converted into one single GMM with parameters $\{\pi_k, \hat{\mu}_t^{(p)}, \hat{\Sigma}_t^{(p)}\}_{k=1}^{K}$, by multiplying the affine-transformed Gaussian components across different frames, as follows $$(\hat{\Sigma}_{t,k})^{-1} = \sum_{p=1}^{P} (\hat{\Sigma}_{t,k}^{(p)})^{-1}, \hat{\mu}_{t,k} = \sum_{t,k} \sum_{p=1}^{P} (\hat{\Sigma}_{t,k}^{(p)})^{-1} \hat{\mu}_{t,k}^{(p)}$$

where the parameters of the updated Gaussian at each frame p are computed as $$\hat{\mu}_{t,k}^{(p)} = A_t^{(p)} \mu_k^{(p)} + b_t^{(p)} \text{ and } \hat{\Sigma}_{t,k}^{(p)} = A_t^{(p)} \mu_k^{(p)} + b_t^{(p)}$$

Hidden semi-Markov Models (HSMMs) have been successfully applied, in combination with TP-GMMs, for robot skill encoding to learn spatio-temporal features of the demonstrations, such as manipulation trajectories of a robot or trajectories of a movable agent.

Hidden semi-Markov Models (HSMMs) extend standard hidden Markov Models (HMMs) by embedding temporal information of the underlying stochastic process. That is, while in HMM the underlying hidden process is assumed to be Markov, i.e., the probability of transitioning to the next state depends only on the current state, in HSMM the state process is assumed semi-Markov. This means that a transition to the next state depends on the current state as well as on the elapsed time since the state was entered.

More specifically, a task parametrized HSMM model consists of the following parameters $$M_\theta = \{\{a_{kh}\}_{h=1}^K, (\mu_k^D, \sigma_k^D), \pi_k, \{\mu_k^{(p)}, \Sigma_k^{(p)}\}_{p=1}^P\}_{k=1}^K$$

where $a_{kh}$ is the transition probability from state k to h; $(\mu_k^D, \sigma_k^D)$ describes the Gaussian distributions for the duration of state k, i.e., the probability of staying in state k for a certain number of consecutive steps; $\{\pi_k, \{\mu_k^{(p)}, \Sigma_k^{(p)}\}_{p=1}^P\}_{k=1}^K$ equals the TP-GMM introduced earlier and, for each k, describe the emission probability, i.e., the probability of observation, corresponding to state k. In an HSMM the number of states correspond to the number of Gaussian components in the "attached" TP-GMM. In general, HSMM states are Gaussian distributions, which means that its observation probability distribution is represented as a classical GMM. To render HSMM to be object-centric, the observation probabilities can be parametrized as it is done in TP-GMM to obtain a TP-HSMM.

Given a certain sequence of observed data points $\{\xi_\ell\}_{\ell=1}^t$, the associated sequence of states in $\mathcal{M}_\theta$ is given by $s_t = s_1$, $s_2 \ldots s_t$. The probability of data point $\xi_t$ belonging to state k (i.e., $s_t = k$) is given by the forward variable $a_t(k) = p(s_t = k, \{\xi_\ell\}_{\ell=1}^t)$:

$$a_t(k) = \sum_{\tau=1}^{t-1} \sum_{h=1}^{K} a_{t-\tau}(h) a_{hk} N(\tau \mid \mu_k^D, \sigma_k^D) o_\tau^t$$

where $o_\tau^t = \prod_{\ell=t-\tau+1}^{t} N(\xi_\ell \mid \hat{\mu}_{\ell,k}, \hat{\Sigma}_{\ell,k})$ is the emission probability, where $(\hat{\mu}_{t,k}, \hat{\Sigma}_{t,k})$ are derived from $(\hat{\Sigma}_{t,k})^{-1} = \sum_{p=1}^{P} (\hat{\Sigma}_{t,k}^{(p)})^{-1}$, $\hat{\mu}_{t,k} = \hat{\Sigma}_{t,k} \sum_{p=1}^{P} (\hat{\Sigma}_{t,k}^{(p)})^{-1} \hat{\mu}_{t,k}^{(p)}$ as shown above. Furthermore, the same forward variable can also be used during reproduction to predict future steps until $T_m$. In this case however, since future observations are not available, only transition and duration information are used, i.e., by setting $N((\xi_\ell \mid \hat{\mu}_{\ell,k}, \hat{\Sigma}_{\ell,k}) = 1$ for all k and $\ell > t$ in $a_t(k) = \sum_{\tau=1}^{t-1} \sum_{h=1}^{K} a_{t-\tau}(h) a_{hk} N(\tau \mid \mu_k^D, \sigma_k^D) o_\tau^t$. At last, the sequence of the most-likely states $s^*_{T_m} = s^*_1, s^*_2 \ldots s^*_{T_m}$ is determined by choosing $s^*_t = \arg\max_k a_t(k), \forall 1 \leq t \leq T_m$.

All demonstrations are recorded from multiple frames. Normally, these frames are closely attached to the objects in $O_{a_h}$. For example, the skill "insert the peg in the cylinder" involves the objects "peg" and "cylinder", and the associated demonstrations are recorded from both the robot, the "peg" and the "cylinder" frames, respectively.

In addition, consider a set of pre-defined predicates, denoted by $B = \{b_1, b_2, \ldots, b_L\}$, representing possible geometric relations among the objects of interest. Here, predicates $b \in B$ are abstracted as Boolean functions taking as inputs the status of several objects while outputting whether the associated geometric relation holds or not. For instance, grasp:=$O \to B$ indicates whether an object is grasped by the robot arm; within: $O \times O \to B$ indicates whether an object is inside another object; and onTop: $O \times O \to B$ indicates whether an object is on the top of another object. Note that these predicates are not bound to specific manipulation skills but rather shared among them. Usually, such predicate functions can be easily validated for the robot arm states and the object states (e.g., position and orientations).

Finally, a goal specification G is given as a propositional logic expression over the predicates B, i.e., via nested conjunction, disjunction and negation operators. In general, the goal specification G represents the desired configuration of the arm and the objects, assumed to be feasible. As an example, one specification could be "within(peg,cylinder) ∧onTop(cylinder, box)", i.e., "the peg should be inside the cylinder and the cylinder should be on top of the box".

In the following, a problem can be defined as follows: Given a set of demonstrations D for skills A and the goal G, the objective is a) to learn a TP-HSMM model $M_\theta$ of the form $$M_\theta = \{\{a_{kh}\}_{h=1}^K, (\mu_k^D, \sigma_k^D), \pi_k, \{\mu_k^{(p)}, \Sigma_k^{(p)}\}_{p=1}^P\}_{k=1}^K,$$

for each demonstrated skill $a_h$ and reproduce the skill for a given final configuration G. For the reproduction of the skill the sequence of states obtained through Viterbi algorithm can be used.

b) to construct a PDDL model P of the form $$P = (P_D, P_P)$$

where Objects, Initial State and Goal Specification define a problem instance $P_P$, while Predicates and Actions define the domain of a problem $P_D$;

c) to derive and subsequently execute the sequence of manipulation skills, such that the probability of achieving the given goal specification G is maximized. Once the domain and problem files are specified, a PDDL (Planning Domain Definition Language.) planner has to find a sequence of actions to fulfill the given goal specification, starting from the initial state.

The PDDL model P includes a domain for the demonstrated skills and a problem instance given the goal specification G.

The Planning Domain Definition Language (PDDL) is the standard classic planning language. Formally, the language consists of the following key ingredients:

Objects, everything of interest in the world;
Predicates, object properties and relations;
Initial States, set of grounded predicates as the initial states;
A goal Specification, the goal states; and
Actions, how predicates are changed by an action and also the preconditions on the actions.

In the example embodiment described herein, motion planning is performed at the end-effector/gripper trajectory level. This means it is assumed that a low-level motion controller is used to track the desired trajectory.

Figure 2:
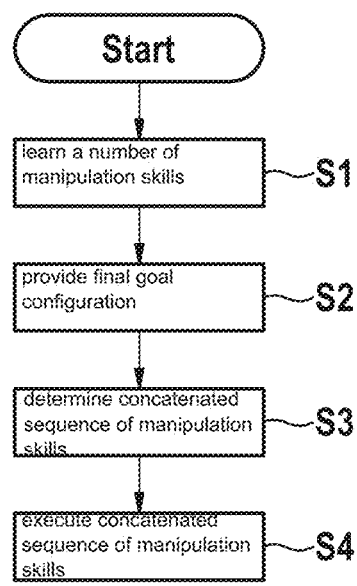
FIG. 2 shows a flowchart illustrating the method or manipulation of an object by sequencing of manipulation skills.

The example method for planning a manipulation task is described in detail with respect to the flowchart of FIG. 2.

Firstly, a TP-HSMM model $M_\theta$ is to be learned for each demonstrated skill $a_h$ and reproduce the skill for a given final configuration G.

One demonstrated skill $a_h \in A$ is considered. As described above, the set of available demonstrations, recorded in P frames, is given by $D_{a_h} = \{\xi_t\}_{t=1}^N$. Furthermore, the set of objects involved with skill $a_h$ is given by $O_{a_h}$. The P frames are directly attached to the objects in $O_{a_h}$.

Figure 3:
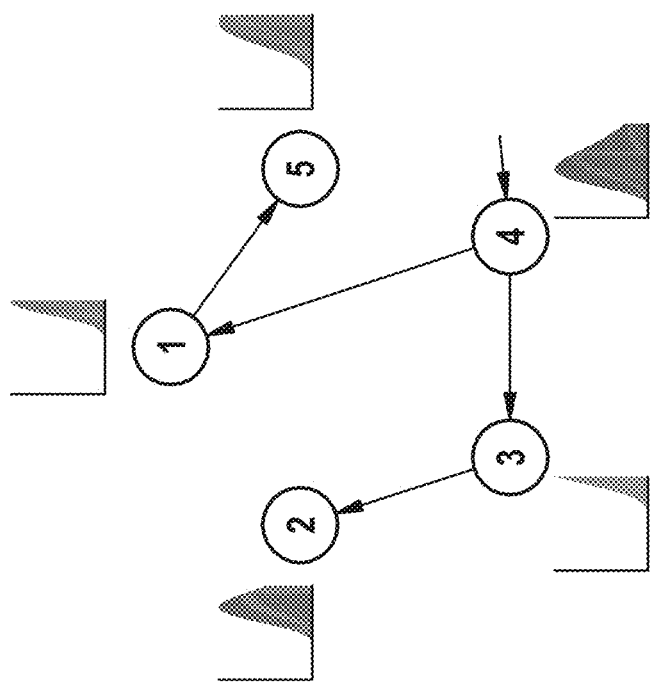
FIG. 3 shows illustrations for HSMM states of a learned manipulation skill wherein demonstration trajectories and transition probabilities are illustrated.
Figure 3:
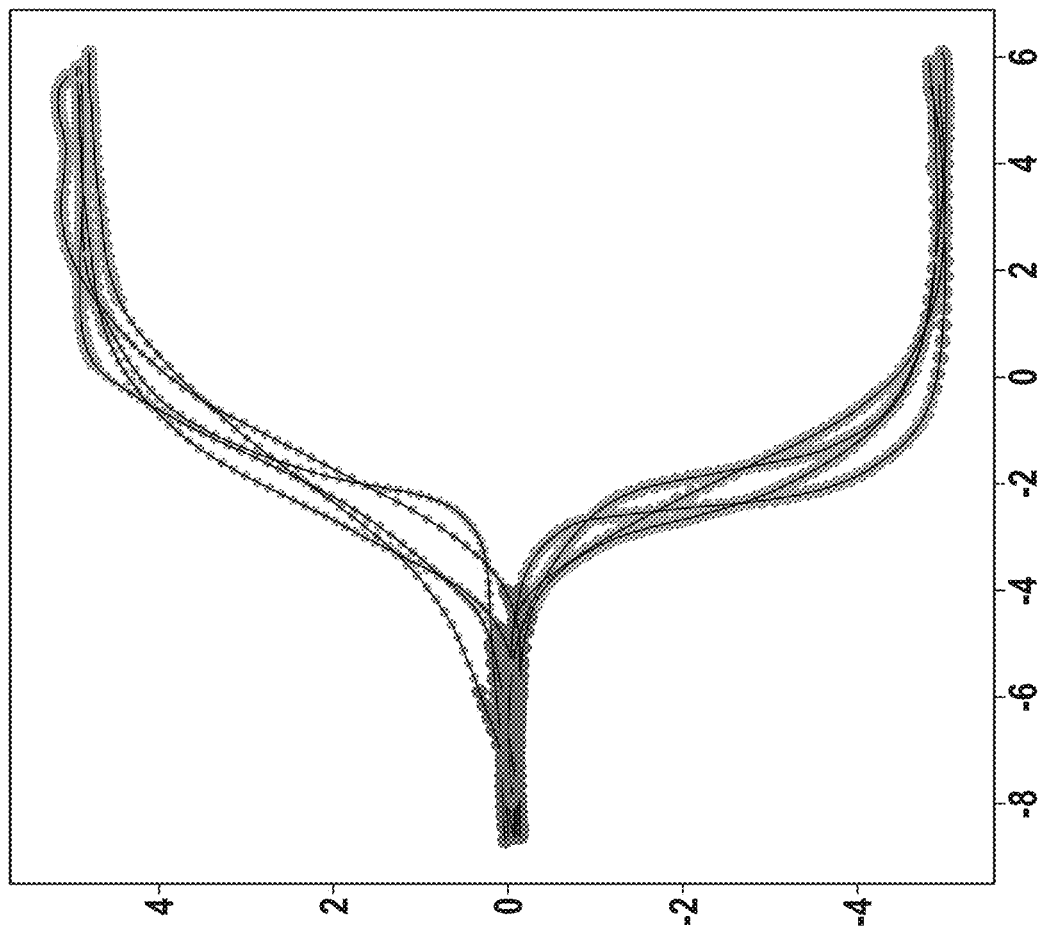

Given a properly chosen number of components K which correspond to the TP-HSMM states, which are the Gaussian components representing the observation probability distributions, the TP-HSMM model $M_{a_h}$ abstracting the spatio-temporal features of trajectories related to skill $a_h$, can be learned in step S1 using, e.g., an EM-like algorithm. This is beneficial as only one model for the general skill is constructed. FIG. 3 shows an example of an HSMM for "pick the peg" skill that contains 10 demonstrations for "pick from top" and "pick from side". The learned HSMM model in the global frame has a single initial HSMM state from which two branches encode the two different instantiations of the same "pick" skill. FIG. 3 shows illustrations for HSMM states of a learned skill wherein demonstration trajectories in 2D(left) and transition probabilities between associated states are shown.

A final goal configuration G is provided in step S2 which can be translated into the final state of the end effector 22 $x_G \in \mathbb{R}^3 \times S^3 \times \mathbb{R}^1$. This configuration can be imposed as the desired final observation of the reproduction, i.e., $\xi_{T_m} \equiv x_G$. Similarly, the initial configuration of the end-effector 22 can be imposed as the initial observation, i.e., $\xi_0 \equiv x_0$. Following, the most likely sequence $s^*_{T_m}$ given only by $\xi_0$ and $\xi_{T_m}$.

The forward variable of formula $$a_t(k) = \sum_{\tau=1}^{t-1} \sum_{h=1}^{K} a_{t-\tau}(h) a_{hk} N(\tau | \mu_k^D, \sigma_k^D) o_\tau^t$$

allows to compute the sequence of marginally most probable states, while we are looking for the jointly most probable sequence of states given the last observation $\xi_{T_m}$. As a result, when using above formula there is no guarantee that the returned sequence $s^*_{T_m}$ will match both the spatio-temporal patterns of the demonstrations and the final observation. In terms of the example in FIG. 3, it may return the lower branch as the most likely sequence (i.e., to grasp the object from the side), even if the desired final configuration is that the end effector 22 is on the top of object.

To overcome this issue, in step S3 a modification of the Viterbi algorithm is used. Whereas the classical Viterbi algorithm has been extensively used to find the most likely sequence of states (also called the Viterbi path) in classical HMMs that result in a given sequence of observed events, the modified implementation differs in that: (a) it works on HSMM instead of HMM; and that (b) most observations except the first and the last ones are missing.

Specifically, in the absence of observations the Viterbi algorithm becomes $$\delta_t(j) = \max_{d \in D} \max_{i \neq j} v_{t-d}(i) a_{ij} p_j(d) \prod_{t'=t-d+1}^{t} \tilde{b}_j(\xi_{t'})$$

$$\delta_1(j) = b_j(o_1) \pi_j p_j(1)$$

where $$\tilde{b}_j(\xi_{t'}) = \begin{cases} N\left(\xi_{t'} | \hat{\mu}_j, \widehat{\sum_j}\right), & t = 1 \lor t = T \\ 1, & 1 < t < T \end{cases}$$

The Viterbi algorithm is modified to include missing observations, which is basically what is described for variable 'b'. Moreover, the inclusion of duration probabilities $p_j(d)$ in the computation of variable 'd_t(j)' makes it work for HSMM.

At each time t and for each state j, the two arguments that maximize equation $\delta_t(j)$ are recorded, and a simple backtracking procedure can then be used to find the most probable state sequence $s^*_{T_m}$.

The above modified Viterbi algorithm provides the most likely state sequence for a single TP-HSMM model that produces the final observation $\delta_T$. As multiple skills are used, these models need to be sequenced and $\delta_t(j)$ has to be computed for each individual model $M_{a_h}$. However, only $\xi_1$ and $\xi_T$ can be observed, thus some models will not produce observations. An additional challenge emerges when sequencing HSMMs: as the state transition probabilities between subsequent HSMM states are unknown, the Viterbi algorithm cannot be applied directly to find the optimal state sequence.

As a next step, symbolic abstractions of the demonstrated skills allow the robot to understand the meaning of each skill on a symbolic level, instead of the data level of HSMM. This may generalize a demonstrated and learned skill. Hence, the high-level reasoning of the herein described PDDL planner, needs to understand how a skill can be incorporated into an action sequence in order to achieve a desired goal specification starting from an initial state. A PDDL model contains the problem instance $P_p$ and the domain $P_D$.

While the problem $P_p$ can be easily specified given the objects O, the initial state and the goal specification G, the key ingredient for symbolic abstraction is to construct the actions description in the domain $P_D$ for each demonstrated skill, wherein $P_D$ should be invariant to different task parameters.

$a_h \in A$ is a symbolic representation for one demonstrated skill in PDDL form. The learned TP-HSMM $M_{a_h}$ contains a task-parametrized model $$\{\pi_k, \{\mu_k^{(p)}, \Sigma_k^{(p)}\}_{p=1}^P\}_{k=1}^K.$$

For each model, it is then possible to identify two sets, each of which containing initial and final states and denoted by $\mathcal{I}, \mathcal{F} \subseteq \{1, \ldots, K\}$, respectively.

To construct the preconditions of a skill, the segments of demonstrations that belong to any of the initial state are to be identified, and to further derive the low-variance geometric relations which can be mapped into the set of predicates B. For each initial state $i \in \mathcal{I}$, its corresponding component in frame p is given by $(\mu_i^p, \Sigma_i^{(p)})$ for $p=1, \ldots, P$. These frames correspond to objects $\{o_1, \ldots, o_P\}$, i.e., skill $a_h$ interacts with these objects. For each demonstration $\{\xi_t^{(p)}\}_{t=1}^{T_m} \in D_{a_h}$, the most-likely sequence $s^*_{T_m} = s^*_1 s^*_2 \ldots s^*_{T_m}$ can be computed as described above. If the first $T_i$ time steps correspond to state i, namely, $s^*_1 = s^*_2 = \ldots = s^*_{T_i} = i$, one instance of the predicate $b_i \in B$ can be evaluated at state i along this segment:

$$b_i(o_1, \ldots, o_P) = T, \text{ if}$$

$$\frac{\sum_{t=1}^{T_i} \mathbb{1}_{b_t}(o_1^t, \ldots, o_P^t) = T}{T_i} > \eta$$

where $0 < \eta < 1$ is a design parameter (probability threshold). $o_1^t, \ldots, o_P^t$ are object states computed based on the recorded frame coordinates $\{b_t^{(P)}, A_t^{(p)}\}_{p=1}^P$ and object geometric dimensions. Denote by $B_i$ the set of instantiated predicates that are True within state i, $\forall i \in \mathcal{I}$. As a result, the overall precondition of skill $a_h$ is given by the disjunction of the conjunction of these predicates for each initial state, i.e., $$PreCond(a_h) = \bigvee_{i \in \mathcal{I}} \bigwedge_{b \in B_i} b$$

where $\nabla$ and $\Lambda$ are the disjunction and conjunction operations. Similarly, to construct the effect of a skill, the procedure described above can be applied to the set of final states $\mathcal{F}$. In particular, for each final state $f \in \mathcal{F}$, the set of instantiated predicates that are True within f is denoted by $B_f$. However, in contrast to the precondition, the effect cannot contain a disjunction of predicates. Consequently, the effect of skill $a_h$ is given by $$\text{Effect}(a_h) = \bigwedge_{f \in \mathcal{F}} \bigwedge_{b \in B_i} b$$

as the invariant predicates common for all of the final states. Based on the above elements, the PDDL model P can be generated in an automated way. More importantly, the domain $P_D$ can be constructed incrementally whenever a new skill is demonstrated and its descriptions are abstracted as above. On the other hand, the problem instance $P_p$ needs to be re-constructed whenever a new initial state or goal specification is given.

Following, it is referred to the planning and sequencing of trained and abstracted skills. The PDDL definition P has been constructed, which can be directly fed into any compatible PDDL planner. Different optimization techniques can be enforced during the planning, e.g., minimizing the total length of the plan or total cost. Denote by $a^*_D = a^*_1 = a^*_2 \ldots a^*_D$ the generated optimal sequence of skills, where $a^*_d \in A$ holds for each skill. Moreover, denote by $M_{a^*_d}$ the learned TP-HSMM associated with $a^*_d$.

Given this sequence $a^*_D$, each skill within $a^*_D$ is reproduced as the end-effector trajectory level, so to maximize the probability of satisfying the given goal G.

The learned TP-HSMM encapsulates a general skill that might have several plausible paths and the choice relies heavily on the desired initial and final configurations. To avoid incompatible transitions from one skill to the next, a compatibility measure shall be embedded while concatenating the skills within $a^*_D$. Particularly, the proposed solution contains three main steps:

a) Cascade the TP-HSMMs of each skill within $a^*_D$ into one complete model $\hat{M}_{a^*_D}$, by creating transition probabilities according to the divergence between the final states/components of the previous manipulation skill and the initial states of the current manipulation skill.

Since the transition from one skill to another is never demonstrated, such transition probabilities are computed from the divergence of emission probabilities between the sets of final and starting states. Particularly, consider two consecutive skills $a_d^*$ and $a_{d+1}^*$ in $\alpha_D^*$. The transition probability from one final state f of $M_{a_d}^*$ to one starting state i of $M_{a_{d+1}}^*$ is given by $$a_{fd} \propto \exp\left(-\alpha * \sum_{p \in P_c} KL\left(N\left(\mu_f^{(p)}, \Sigma_f^{(p)}\right) \middle\| N\left(\mu_i^{(p)}, \Sigma_i^{(p)}\right)\right)\right)$$

where $KL(\cdot\|\cdot)$ is a KL-divergence (Kullback-Leibler-Divergence; see also Kullback, S.; Leibler, R. A., "On Information and Sufficiency." Ann. Math. Statist. 22 (1951), no. 1, 79-86. doi:10.1214/aoms/1177729694, $P_c$ is the set of common frames between these two skills, and $\alpha \geq 0$ is a design parameter. The outgoing probability of any final state should be normalized. This process is repeated for all pairs of starting and final states between consecutive skills in $a_D^*$. In this way, one complete model $\hat{M}_{a_D^*}$ has been created for the desired sequence of skills.

b) Find the most-likely complete state sequence $\hat{s}^*_{T_D}$ within $\hat{M}^*_{a_D}$ given the initial and goal configurations. Given the derived complete TP-HSMM $\hat{M}^*_{T_D}$, the observed initial state and the goal specification, the above modified Viterbi algorithm can be applied to find the most-likely state sequence $\hat{s}^*_{T_D}$.

c) Generate the robot end-effector trajectory that optimally tracks $\hat{s}^*_{T_D}$, namely, to reproduce all skills in $a^*_D$. Given the states sequence $\hat{s}^*_{T_D}$, a linear quadratic regulator (LQR) can be applied to generate the necessary control commands to reproduce the optimal state sequence $\hat{s}^*_{T_D}$. A step-wise reference is obtained from $\hat{\mu}_{s_t}, \forall s_t \in \hat{s}^*_{T_D}$, which is tracked by the LQR[1] using associated tracking precision matrices $\hat{\Sigma}_{s_t}^{-1}$. As the robot state x lies in the Riemannian manifold $M_R = \mathbb{R}_3 \times S^3 \times \mathbb{R}^1$, the emission probabilities are therefore Riemannian Gaussian, and thus the step-wise reference is also given in $M_R$. This implies that the required linear system dynamics for the end-effector 22 cannot be defined on $M_R$, since it is not a vector space. However, the linear tangent spaces can be exploited to achieve a similar result. Specifically, the state error between the desired reference $\hat{\mu}_{s_t}$ and current robot state $x_t$ can be computed using the logarithmic map $$\log_{\hat{\mu}_{s_t}}(x_t)$$

that projects the minimum length path between $\hat{\mu}_{s_t}$ and $x_t$ into the Euclidean space $$\mathcal{T}_{\hat{\mu}_{s_t}} M_R.$$

The covariance matrices $\hat{\Sigma}_{s_t}$ describe the variance and correlation of the robot state variables in a tangent space $$\mathcal{T}_{\hat{\mu}_{s_t}} M_R.$$

Under the above assumptions, the control objective in the tangent space can be formulated as $$c(u) = \int \left( \log_{\hat{\mu}_{s_t}}(x_t)^T \hat{\Sigma}_{s_t}^{-1} \log_{\hat{\mu}_{s_t}}(x_t) + u_t^T R u_t \right) dt$$

where u is the control input and R regulates the control effort. To retrieve only the reference trajectory, it can be assumed double integrator dynamics, which provides smooth transitions between consecutive $\hat{\mu}_{s_t}$.

Finally, in step S4 the concatenated sequence of manipulation skills is executed.

What is claimed is:

1. A computer-implemented method for planning a manipulation task of a robot, comprising the following steps:
   learning a number of manipulation skills and generating a symbolic abstraction of each of the manipulation skills, by which a respective statistic model of a transition to a respective final state from a respective current state is determined for each of the learned manipulation skills;
   determining a concatenated sequence of a subset of the manipulation skills selected from the number of learned manipulation skills based on their symbolic abstractions so that a given goal specification indicating a given complex manipulation task is satisfied, wherein:

the determining of the concatenated sequence includes
generating a complete model corresponding to a
combination, in the sequence, of all of the subset of
the manipulation skills; and
the generating of the complete model is performed by
computing, for each of a plurality of pairwise combinations of individual manipulation skills of the
subset, a respective probability of a transition from a
first one of the individual manipulation skills of the
respective pairwise combination to a second one of
the individual manipulation skills of the respective
pairwise combination according to a divergence of
emission probabilities between an end state of the
first one of the individual manipulation skills of the
respective pairwise combination and an initial state
of the second one of the individual manipulation
skills of the respective pairwise combination; and
executing the sequence of manipulation skills.

2. The method according to claim 1, wherein:
the statistical model is a Task Parameterized Hidden Semi-Markov model (TP-HSMM); and
the learning of the number of manipulation skills includes, for each of the number of manipulation skills:
demonstrating and recording a plurality of manipulation trajectories;
determining a respective instance of the TP-HSMM depending on the plurality of manipulation trajectories of the respective manipulation skill; and
determining a respective one of the symbolic abstractions.

3. The method according to claim 2, wherein the generating of the symbolic abstractions of the manipulation skills includes constructing a Planning Domain Definition Language (PDDL) model in which objects, the initial states, and a goal specification define problem instances, and in which predicates and actions define a domain of a given manipulation, wherein the symbolic abstractions of the manipulation skills use a classical PDDL planning language.

4. The method according to claim 2, where the determining of the concatenated sequence of manipulation skills is performed such that a probability of achieving the given goal specification is maximized, wherein a PDDL planning step is used to find a sequence of actions to fulfill the given goal specification, starting from a given one of the initial states.

5. The method according to claim 2, where the transition probabilities are determined using Expectation-Maximization.

6. The method according to claim 2, wherein the symbolic abstractions are determined by mapping low-variance geometric relations of segments of the manipulation trajectories into a set of predicates.

7. The method according to claim 2, wherein the determining of the concatenated sequence of manipulation skills includes optimizing a goal of minimization of a total length of a combined trajectory of the concatenated sequence.

8. The method according to claim 7, wherein the determining of the concatenated sequence of manipulation skills includes selectively reproducing one or more of the manipulation skills of the sequence of manipulation skills so as to maximize a probability of satisfying the given goal specification.

9. The method according to claim 7, wherein the determining of the concatenated sequence of manipulation skills further includes searching a most-likely complete state sequence between initial and goal states of the complex manipulation task as a whole using a Viterbi algorithm.

10. The method according to claim 7, wherein the determining of the concatenated sequence of manipulation skills further includes searching a most-likely complete state sequence between initial and goal states of the manipulation task as a whole using a Viterbi algorithm that includes missing observations and duration probabilities.

11. The method according to claim 1, wherein an individual one of the manipulation skills of the subset is included multiple times within the concatenated sequence.

12. A device for planning a manipulation task of a robot, the device comprising a processor, the processor configured to:
learn a number of manipulation skills, thereby generating a symbolic abstraction of each of the manipulation skills and by which a respective statistic model of a transition to a respective final state from a respective current state is determined for each of the learned manipulation skills;
determine a concatenated sequence of a subset of the manipulation skills selected from the number of learned manipulation skills based on their symbolic abstractions so that a given goal specification indicating a complex manipulation task is satisfied; and
instruct execution of the sequence of manipulation skills;
wherein:
the determination of the concatenated sequence includes generating a complete model corresponding to a combination, in the sequence, of all of the subset of the manipulation skills; and
the generating of the complete model is performed by computing, for each of a plurality of pairwise combinations of individual manipulation skills of the subset, a respective probability of a transition from a first one of the individual manipulation skills of the respective pairwise combination to a second one of the individual manipulation skills of the respective pairwise combination according to a divergence of emission probabilities between an end state of the first one of the individual manipulation skills of the respective pairwise combination and an initial state of the second one of the individual manipulation skills of the respective pairwise combination.

13. A non-transitory machine-readable storage medium on which is stored a computer program that is executable by a computer and that, when executed by the computer, causes the computer to perform a method for planning a manipulation task of a robot, the method comprising the following steps:
learning a number of manipulation skills and generating a symbolic abstraction of each of the manipulation skills, by which a respective statistic model of a transition to a respective final state from a respective current state is determined for each of the learned manipulation skills;
determining a concatenated sequence of a subset of the manipulation skills selected from the number of learned manipulation skills based on their symbolic abstractions so that a given goal specification indicating a given complex manipulation task is satisfied, wherein:
the determining of the concatenated sequence includes generating a complete model corresponding to a combination, in the sequence, of all of the subset of the manipulation skills; and
the generating of the complete model is performed by computing, for each of a plurality of pairwise combinations of individual manipulation skills of the subset, a respective probability of a transition from a first one of the individual manipulation skills of the respective pairwise combination to a second one of the individual manipulation skills of the respective pairwise combination according to a divergence of emission probabilities between an end state of the first one of the individual manipulation skills of the respective pairwise combination and an initial state of the second one of the individual manipulation skills of the respective pairwise combination; and executing the sequence of manipulation skills.

\* \* \* \* \*